US007740700B2

(12) United States Patent
Wallner

(10) Patent No.: US 7,740,700 B2
(45) **Date of Patent: *Jun. 22, 2010**

(54) CEMENTITIOUS VENEER AND LAMINATE MATERIAL

(75) Inventor: Christine E. Wallner, Berkeley, CA (US)

(73) Assignee: Ecomeld Corp., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/146,237

(22) Filed: Jun. 25, 2008

(65) Prior Publication Data

US 2008/0257222 A1 Oct. 23, 2008

Related U.S. Application Data

(63) Continuation of application No. 11/091,648, filed on Mar. 28, 2005, now Pat. No. 7,407,545.

(51) Int. Cl.
*C04B 11/00* (2006.01)

(52) U.S. Cl. ....................... 106/685; 106/686; 106/705; 106/772; 106/778; 106/DIG. 1; 428/325; 428/463; 428/513; 428/522; 428/697; 428/698; 428/699; 428/701; 428/703

(58) Field of Classification Search ................. 106/685, 106/686, 705, 772, 778, DIG. 1; 428/325, 428/463, 513, 522, 697, 698, 699, 701, 703
See application file for complete search history.

(56) References Cited

U.S. PATENT DOCUMENTS 6,913,819 B2 * 7/2005 Wallner
7,407,505 B2 * 8/2008 Sauer et al. ................. 606/145
7,407,545 B2 * 8/2008 Wallner ...................... 106/685

* cited by examiner

*Primary Examiner*—Paul Marcantoni
(74) *Attorney, Agent, or Firm*—Courtney Staniford & Gregory LLP

(57) ABSTRACT

A cementitious veneer and laminate composition is provided. The cementitious laminate composition includes a substrate, a primer layer applied to the substrate, the primer layer comprising a mixture of polyvinyl alcohol catalyst, Portland cement, and sand; and a cementitious veneer layer applied to the primer layer, the veneer layer comprising a mixture of magnesium sulfate, filler, magnesium oxide, gypsum cement, and polyvinyl alcohol catalyst. The polyvinyl alcohol catalyst comprises a mixture of polyvinyl alcohol fibers dissolved in water and mixed with butylene carbonate. The veneer layer is applied to the substrate and primer layer by means including spraying and manual spreading. The veneer layer can be ornamentally manipulated either before or after curing of the veneer layer. The veneer composition can be formed into laminated tiles or panels for use in building applications.

11 Claims, 3 Drawing Sheets

40

20

10

CEMENTITIOUS VENEER AND LAMINATE MATERIAL

CROSS-REFERENCE TO RELATED APPLICATIONS

The present application is a Continuation application of currently pending patent application Ser. No. 11/091,648, filed on Mar. 28, 2005, and entitled "Cementitious Veneer and Laminate Material", which is a Divisional application of patent application Ser. No. 10/330,767, filed on Dec. 27, 2002, entitled "Cementitious Veneer and Laminate Material", now issued as U.S. Pat. No. 6,913,819.

FIELD OF THE INVENTION

The present invention relates to decorative surface coatings and, more particularly, to durable surface coatings that incorporate a cementitious veneer.

DESCRIPTION OF RELATED ART

Traditional building materials, such as stone, cement, brick, and tile objects have long been valued for both their structural integrity and aesthetic appearance. Since these materials are typically heavy and cumbersome, special measures must often be undertaken to ensure that objects and structures made of such materials are properly supported. Unfortunately, not all existing buildings or other structures are capable of bearing the weight of such objects. Indeed, costly reinforced frames, reinforced flooring, and so on, are frequently required to ensure such support. In some cases, these structures may impose very significant costs and require overly complicated building techniques.

In addition, the material cost of stone, cement, brick, and tile (hereinafter collectively referred to as "masonry") can also be expensive. Consequently, economical lighter weight surface coatings that simulate the appearance of masonry have been used to enhance the appearance of both utilitarian and decorative objects.

FIG. 1 is a perspective view of an uncoated surface 10 according to the prior art. It is well known in the prior art to apply a surface coating or covering to such a surface, for both structural and aesthetic purposes. Examples of common surface coatings that have been made to simulate the appearance of masonry include vinyl coverings, fabrics, paints, plaster, plastics (e.g., Corian™), and other manufactured materials, such as Formica™. Generally, however, these materials have various disadvantages. Vinyl floor and wall coverings usually provide a rubbery appearance and are typically recognizable as imitations. Fabrics and paint may be printed or applied in such manner to give a superficial appearance of masonry, but since these materials are quite different as compared to masonry, they are also often easily detectable as imitations. Moreover, fabrics and paint are relatively delicate and do not withstand a great deal of wear and tear. Plaster may provide a better approximation of masonry than the above materials, but plaster is relatively soft, lacks durability and is subject to chipping and cracking. Sheet rock, plaster and gypsum products are also susceptible to black mold growth that often results when the paper backing used for such wallboard products comes into prolonged contact with water or moisture.

The search for lightweight durable materials that give the appearance of masonry has lead to the development of masonry-like coatings that may be applied to suitable foundation materials such as wood, metal, cement fiber boards, or polymeric objects. For example, a method and apparatus for producing an ornamental concrete surface is described in U.S. Pat. No. 5,502,941. As described therein, an ornamental coating which appears as brick or flagstone may consist of a waterproof sub-base of epoxy resin and an elastomeric sealant covered with fiberglass webbing. A first mortar layer of cement, sand, color pigment and aqueous solution of adhesive resin is then sprayed or troweled on. When the first layer cures, a template having a pattern of grout lines is placed over the first layer and a second mortar layer having the same composition as the first layer is applied except that a contrasting color is used to give the appearance of grouted brick or flagstones. The ratio of cement to sand is given as fifty-fifty with solution of acrylic resin varying from one and one-half to two gallons per 46 pounds bag of dry cement/sand mix.

In U.S. Pat. No. 5,447,752, a method is described for making a decorative cementitious pattern on a surface. The surface coating composition is described as comprising cement, sand, a polymer binder, and water. The binder is an acrylic latex polymer, such as styrene butadiene in water. Cement is mixed with sand (30%-40% cement) to form a mixture which is combined with the binder solution in an amount ranging from two to three gallons binder solution to 100 pounds cement/sand. The preexisting surface is etched with muriatic acid, brushed and spray washed. A template having a desired pattern is placed on the surface and a layer of the surface coating composition is applied into openings in the template by spraying or by manual spreading.

U.S. Pat. No. 3,592,724 describes a cementitious laminate of sulfonated polymers useful for making walls, floors, ceilings and plasterboards having improved water vapor impermeability. As described therein, the laminates consist essentially of a surface sulfonated water insoluble resinous film and an inorganic cementitious material adhering to at least one surface of the film. In one aspect, hydraulic cement is plastered on a wall and sulfonated film is adhered to the plastered wall. The laminated wall may be finished with a coat of gypsum plaster.

In general, present known techniques for producing cementitious laminates present certain disadvantages. These include expensive and complicated processes, and/or the production of laminates that are heavy and difficult to use and install. A further disadvantage of present techniques is that the laminates produced do not feature surfaces that are sufficiently scratch-resistant, fireproof, or waterproof enough for many industrial or home use environments. Also, available thin cement or concrete veneers are inherently brittle due to the use of relatively large-size aggregates; the use of polymers to counteract the problem of brittleness and cracking due to these aggregates often results in a veneer that is overly plastic or resin-like in appearance. A yet further disadvantage associated with present cement and concrete manufacturing methods is that they are generally very polluting and impose a significant impact on the environment.

It is therefore desirable to provide a process that produces economical lightweight and durable coatings, which can be used to simulate the appearance and function of masonry.

It is further desirable to produce cementitious laminates and veneers that utilize inexpensive and preferably recycled materials that satisfy present environmental and sustainability concerns.

It is yet further desirable to produce a cementitious veneer that features the use of micro-aggregates to prevent the problem of brittleness associated with present thin cement veneers.

It is also desirable to produce a cementitious veneer that is readily formable into lightweight transportable panels for use in building applications.

SUMMARY OF THE INVENTION

A cementitious laminate composition, and method for applying said composition are provided. The cementitious laminate composition includes a substrate, a primer layer applied to the substrate, the primer layer comprising a mixture of polyvinyl alcohol catalyst, Portland cement, and sand; and a veneer layer applied to the primer layer, the veneer layer comprising a mixture of magnesium sulfate, Fillite, magnesium oxide, gypsum cement, and polyvinyl alcohol catalyst. The polyvinyl alcohol catalyst in the primer and veneer layers comprises a mixture of polyvinyl alcohol fibers dissolved in water and mixed with butylene carbonate. The primer layer is applied to the substrate to provide an adhesive surface that bonds the veneer layer to the substrate. The veneer layer is applied to the substrate and primer layer by means including spraying and manual spreading. The veneer layer can be ornamentally manipulated either before or after curing. The cementitious laminate composition can be provided as a kit including the substances used to form the primer and veneer layers. The veneer composition can be formed into laminated tiles or panels for use in building applications.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DESCRIPTION OF THE PREFERRED EMBODIMENT

Embodiments of the present invention provide a cementitious, masonry-like veneer surface that is economical, lightweight, highly durable and versatile. The cementitious veneer can be readily provided in a variety of colors and textures. In addition, it can also be shaped, molded, sanded and/or polished to achieve many desired appearances.

Embodiments of the invention also provide an accurate simulation of the appearance, feel and durability of natural masonry. The cementitious veneer of the present invention has sufficient strength to resist chipping, gouging and cracking, but is light enough to cover desired objects without requiring additional support. In addition, the cementitious veneer described herein features advantageous heat and water resistance characteristics, making it suitable for use in a variety of different building and finishing applications.

In a preferred embodiment, the cementitious laminate material described herein comprises a substrate layer coated with an adhesion or primer layer, onto which is applied a cementitious veneer layer. The substrate provides a firm backing structure for the cementitious veneer, and the adhesion layer helps adhere the cementitious veneer layer to the substrate. The cementitious veneer layer comprises the outer layer of the cementitious laminate material that features the appearance of a natural masonry material.

Substrate Layer

Figure 1:
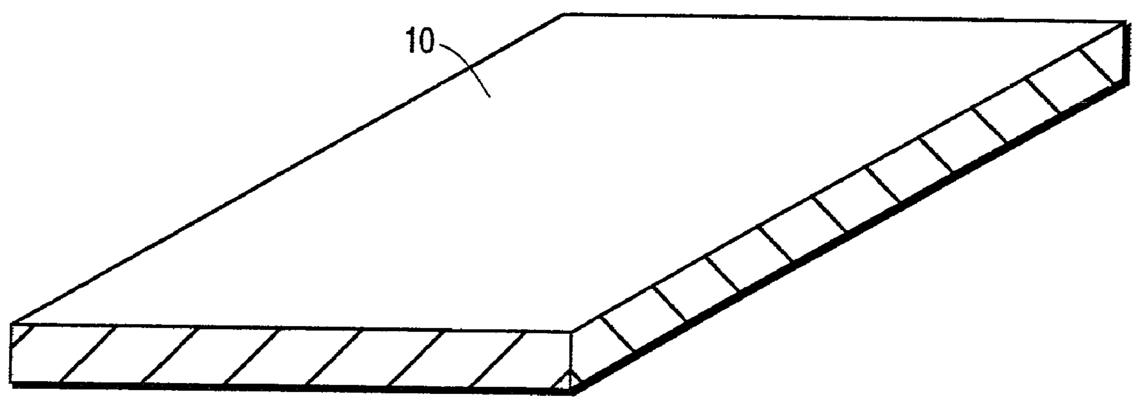
FIG. 1 is a perspective view of an uncoated substrate surface according to the prior art.
Figure 2:
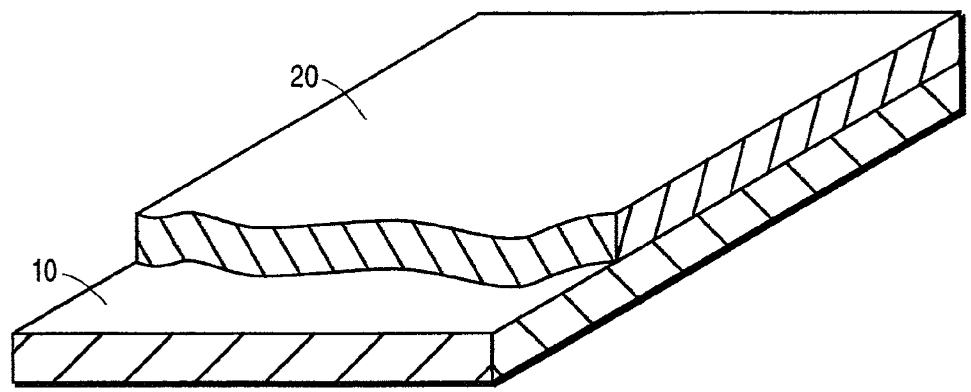
FIG. 2 is a perspective view of a substrate surface coated with a primer layer for a cementitious laminate according to one embodiment of the invention.

The cementitious veneer can be applied to cover any appropriate underlying surface on which a masonry-like finish is desired. The underlying support surface comprises a substrate, which serves as the base building material upon which first (primer) and second (cementitious veneer) layers are placed, and in general can be of any shape, such as flat or curved. For optimum results, the substrate should be a stiff, non-breathable material. FIG. 2 illustrates a substrate layer 10 upon which a first layer 20 is applied.

In a preferred embodiment of the present invention, the substrate 10 comprises a honeycomb structural cardboard, such as Hexacomb™ made by Pactiv Corporation. This provides the desired characteristics of lightness, flexibility, strength, and easy installation. Depending upon the honeycomb size, the strength rating of this substrate can range from 8 psi (pounds per square inch) to 60 psi. Other fiber boards can also be used for the substrate, including cement fiberboards, such as Plycem™ made by U.S. Architectural Products, Inc., and Hardi™ Backboard made by Hardi Corporation.

Other suitable substrate materials include metal, masonry, fiberglass, gypsum board, Masonite™, plastics, ceramic, cement fiber board, other types of fiber boards, and other common building materials. Wood can also be used as a substrate material, and would preferably be a non-bending hardwood that exhibits satisfactory non-breathing characteristics.

Adhesion/Primer Coat Layer

As shown in FIG. 2, a first base layer 20 is applied to the underlying substrate surface 10. For application of this layer, the underlying substrate surface should be clean and dry. To provide an optimal bonding surface, the underlying surface can be prepared by etching or sanding. Any method of such surface preparation for bonding known to those with skill in the art may be used herein.

This first base layer 20 is an adhesion layer, also referred to as a "primer layer" or "scratch coat" that acts as an undercoating to help bond the ultimate cementitious veneer layer to the substrate. In one embodiment of the present invention, the primer layer comprises a mixture of polyvinyl alcohol (PVA) catalyst, Portland cement, and resin coated sand. The mixture is produced by combining, on a volume basis, 1.5% to 3.6% Portland cement, 68% to 75% resin coated sand, and 29% to 30% polyvinyl alcohol polymer mixed with butylene carbonate in a ratio of 16:1, respectively. The polyvinyl alcohol polymer is produced by dissolving an amount of polyvinyl alcohol fibers in water in an approximate ratio of one part PVA fibers to 16 parts water. When mixed with butylene carbonate, the polyvinyl alcohol polymer produces the polyvinyl alcohol catalyst (PVA catalyst).

An exemplary formulation which provides an illustration of the relative percentages of these ingredients in the adhesion coat layer is provided as follows:

8 oz. of polyvinyl alcohol polymer mixed 16:1 with butylene carbonate where the PVA polymer is produced by dissolving 30-40 grams of PVA fiber in 16-20 oz. of distilled water 0.40 to 0.80 oz. Portland cement (e.g., Lehigh™ Portland Cement #1 and #2) 15 to 20 oz. resin coated sand (e.g., Borden™ shell process resin coated sand)

The components of the primer layer are mixed together and applied to the substrate surface using any appropriate application means, such as brush, trowel, or spray. Depending upon the size of the batch, curing time is typically between three to five hours at room temperature. This can be reduced to one to two hours in a controlled heat environment.

The PVA polymer component of the adhesion layer can be sourced from re-constituted polyvinyl alcohol fibers dissolved in boiling water, preferably distilled water, in an approximate ratio of 16:1. Polyvinyl alcohol (PVA) is a reground fiber or waste fiber that is generally produced as a by-product in the manufacture of certain medical supplies, such as disposable hospital gowns and hospital bed sheets. As a result, it is an inexpensive material and desirable to use as a recycled material. Polyvinyl alcohol reground fiber, such as is found in the ISOLYSER line of products by Orex produced by United Cotton is an example of an appropriate source of polyvinyl alcohol fibers. Alternatively AIRVOL 125 polyvinyl alcohol can be used in similar concentrations as that of the recycled PVA fibers.

The PVA catalyst is produced by mixing the dissolved mixture of PVA fibers (the PVA polymer) with Jeffsol® butylene carbonate (made by Huntsman Corp.), in a ratio of 16 parts of PVA polymer to one part butylene carbonate. This serves to strengthen the PVA catalyst's molecular bond. An exemplary method of producing a sample size of the PVA catalyst is as follows: boil 16 oz. of distilled water, add 40 grams of polyvinyl alcohol fibers to the boiling water to produce the PVA polymer, allow the PVA polymer to cool and then add 10-15 cc's of butylene carbonate to the mixture. For best results, the PVA fibers should be completely or nearly completely dissolved in the water before cooling and adding of the butylene carbonate.

In an alternative embodiment, propylene carbonate can also be used either wholly or in part to replace the Jeffsol butylene carbonate. In this case, the proportion of propylene carbonate may need to be increased by about 25% over the stated amount of butylene carbonate.

As shown in the formula provided above, the primer layer also includes a small amount of Portland cement at about 2% to 3% of volume. The Portland cement decreases the slickness of the hardened adhesion coat layer. The combination of Portland cement and sand creates concrete, but in this case without much cement, to provide a rough or gritty surface.

The resin-coated sand represents an aggregate that is added to the primer/adhesion layer. When used with the PVA catalyst, resin-coated sand tends to resist absorbing the catalyst. Instead of, or in combination with the resin-coated sand, other aggregates can be used, such as perlite, pumice, vermiculate and man-made pozzalons, and fillite fly ash. Aggregates for use in accordance with the invention are exemplified by a mixture of course and fine relatively inert materials, but may also be of fairly uniform size. Other aggregates that can be used include sand, gravel, silica, glass, crushed stone such as marble, granite, feldspar, basalt, quartz, and so on. However, in a preferred embodiment, resin-coated sand, or other aggregates that exhibit water and/or oil resistance properties, such as quartz, is used.

To improve the heat dispersion properties of the cementitious veneer panel, the adhesion layer can also be impregnated with fillers like aluminum hydrate, which is a refractory cement. The aluminum hydrate is mixed with the resin-coated sand to create an adhesion layer that exhibits pronounced heat dispersion characteristics. The resin-coated sand can also be mixed with other materials, such as perlite, vermiculite, agricultural or regular pumice, or micro-fiber carbon fibers (such as Thermalgraph™ DXDX). These materials also aid in heat dispersion. If any of these optional materials is used for the adhesion layer, the amount of sand can be generally be reduced by a corresponding amount. This aids in reducing the weight of the laminate material. If perlite is used, it should first be soaked in the polyvinyl polymer composition, dried and then granulated before it is added to the adhesion layer mixture. This will reduce its tendency to absorb the PVA catalyst out of the mixture.

In an alternative embodiment of the present invention, the adhesion layer can be formed using Primus®, which is a material commercially available from Dryvit Systems, Inc. Primus® is described by the manufacturer as containing 54-62% sand, 26-28% water and 9.9-10.2% acrylic latex polymer/binder.

FIG. 2 is a perspective view of a substrate surface 10 coated with a primer layer according to the invention. The composition for forming the primer layer 20 is mixed together to form a liquid. This liquid can be applied by means including spraying or manual spreading, for example using a brush or trowel. The viscosity of the mixture is dependent upon the concentration of the polyvinyl alcohol catalyst and aggregate (e.g., resin-coated sand). The viscosity can therefore be adjusted to optimize application to the surface. For example, if application by spraying is desired, a relatively low viscosity mixture is prepared. A more viscous mixture can be prepared for manual spreading.

The primer layer mixture is applied to the underlying substrate material surface prior to curing and hardening. The mixture is then allowed to cure until hard. The mixture can be applied in amounts sufficient to form a layer having a thickness of between approximately 1/16 inch and approximately 1/2 inch, or any other desired thickness.

In one embodiment of the present invention, the primer layer can include fibers, such as carbon fibers embedded within the layer. This increases the fire and heat resistance of the substrate depending upon the thickness of the primer layer and the quantity of added fiber material. It can also increase the strength of the substrate. For improved impact resistance characteristics, materials such as PVA, kevlar, or fiberglass can be added in fiber or mesh form to the adhesion layer.

Once dry, the primer layer provides a good adhesive surface for the second layer (cementitious veneer layer), which is composed primarily of gypsum cement.

Cementitious Veneer Layer

Figure 3:
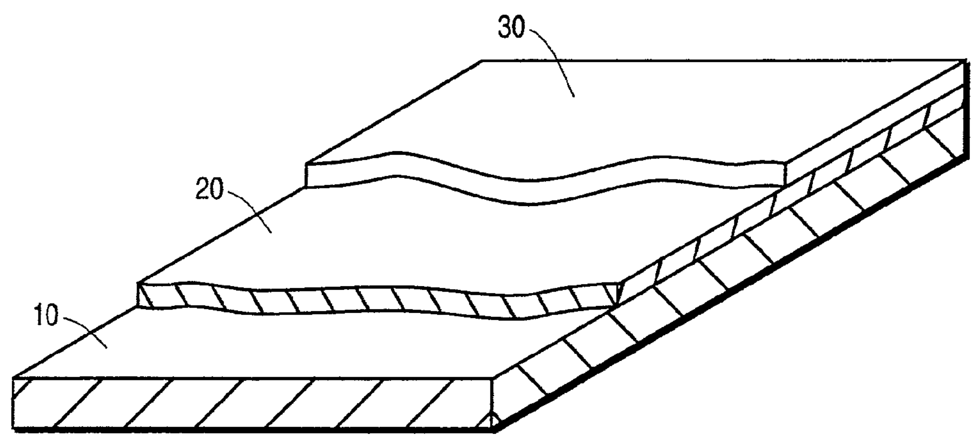
FIG. 3 is a perspective view of a decorative cementitious veneer layer applied to a primer layer and substrate according to one embodiment of the invention.

A cementitious veneer layer 30 is applied to the adhesion layer, as illustrated in FIG. 3, to form the cementitious laminate material. This veneer layer provides the look and feel of a concrete or mineral surface to the lightweight substrate. In one embodiment of the present invention, the cementitious veneer layer 30 comprises a mixture of magnesium sulfate, magnesium oxide, filler (e.g., Fillite), gypsum cement, and polyvinyl alcohol catalyst, along with other components. The two basic components of the cementitious veneer layer are a magnesium oxysulfate composition and a cementitious composition. A more detailed description of each of these two components will be provided in the description that follows.

The magnesium oxysulfate composition is produced by combining, on a volume basis, 0.04% to 0.08% sodium hexametaphosphate, 0.06% to 0.17% phosphoric acid at a concentration of 75% to 85%, 47% to 54% magnesium sulfate, 30% to 35% of magnesium oxide, 1.3% to 1.4% distilled water, and 8% to 11% filler (e.g., Fillite).

An exemplary formulation which provides an illustration of the relative percentages of these ingredients in the magnesium oxysulfate composition is provided as follows:

0.20-0.30 oz of sodium hexametaphosphate (sodium polymetaphosphate)

5 cc-15 cc phosphoric acid at a concentration of 75% to 85%.

10 oz.-13 oz. magnesium sulfate (e.g., Epsom salts) in fine powder form 3.7 oz-4 oz distilled water 8 oz.-10 oz. magnesium oxide 3 oz.-5 oz. filler The sodium hexametaphosphate is a chelating agent which adheres magnesium sulfate to magnesium oxide. This is preferably added to 3.7 oz of distilled water and blended at low speed for five to ten minutes. The phosphoric acid acts to dissolve and evenly disperse the sodium hexametaphosphate throughout the mixture.

As shown above, approximately 8% to 11% filler by volume is added to the magnesium oxysulfate mixture. Fillite 500™ made by Trelleborg Fillite Inc. is a preferred ingredient for the filler. For the above exemplary mixture this would correspond to about 4.0 oz of Fillite. Fillite is an inert, hollow silicate sphere, or granular fly ash that acts as an aggregate and increases the strength and water resistance of the veneer. The addition of Fillite also tends to enhance the flow and molding characteristics of the magnesium oxysulfate mixture. The Fillite is added to the mixture until it is hydrated, and the 10 to 13 oz. of magnesium sulfate is added to the hydrated Fillite. To this mixture, about 10 oz. of magnesium oxide is added to create the final magnesium oxysulfate composition.

With regard to magnesium oxide, Magox™, such as that made by Hills Brothers Chemical is a suitable ingredient for use in the magnesium oxysulfate composition. Standard grade Magox is suitable, as is grade 83 WTG. When combined with the salt, this mixture assumes a liquid elastic consistency. The mixture is slowly mixed for several hours, which is possible due to a relatively long curing time.

To the above first mixture of the magnesium oxysulfate composition is added a second mixture, referred to as the "cementitious composition." The cementitious composition is produced by mixing together, by volume, 1.2% to 1.9% Fillite, 77% to 85% gypsum cement, 13.5% to 14% distilled water, and 1.25% to 2.5% of PVA catalyst (made by mixing 16:1 polyvinyl polymer and butylene carbonate). An exemplary formulation that provides an illustration of the relative percentages of these ingredients in the second mixture is provided as follows:

0.25 oz Fillite 500, prehydrated with 0.5 oz distilled water 11 oz gypsum cement, such as Hydrostone® Super X made by U.S. Gypsum 1.8 oz of distilled water 5 cc of PVA catalyst, where the PVA catalyst consists of 40 g of polyvinyl alcohol fibers boiled in 16 oz distilled water, cooled, then mixed with 30 cc of butylene carbonate.

The cementitious composition is a polymer layer that features waterproof characteristics. The first and second mixtures are combined in the following proportions by weight, two parts first mixture (magnesium oxysulfate composition) to 3.25 parts second mixture (cementitious composition). That is, by volume, the magnesium oxysulfate composition should constitute 61.5% of the combination. In practice, the ratio of magnesium oxysulfate composition could range from 37% to 69%, but it has been found that 61.5% is an optimum ratio. The two mixtures are mixed together for 5-7 minutes at low speed to produce a semi-liquid composition that constitutes the cementitious veneer layer mixture. The cementitious veneer layer 30 can be applied to the adhesion layer 20 by common techniques such as brushing or troweling.

Because magnesium oxide is naturally fire-resistant, the magnesium oxysulfate within the first mixture imparts a fire-resistant characteristic to the cementitious veneer. Likewise, the water-resistant natural properties of Hydrostone Super X when combined with Fillite in the second mixture imparts a useful water-resistant characteristic to the cementitious veneer. The PVA catalyst also aids in water-resistance.

Pigment such as an oxide powder or paste may be added to impart a desired color to the mixture of the cementitious veneer layer 30. Any pigment compatible with cement/gypsum known to those with skill in the art may be used herein.

During the drying period, the surface of the cementitious veneer layer may be ornamentally manipulated by means including embossing with a template, pressing, stamping, or carving.

After the cementitious veneer layer has cured it is generally finished, but if desired, it can be further finished by polishing through techniques such as wet or dry sanding. The cementitious veneer can be coated on a material which can itself be cut. The cementitious veneer layer can be cut along with the underlying material. In such case, the veneer layer generally does not chip or scratch, and any rough edges can be easily polished if desired.

As stated above, the primer layer can include fibers, such as carbon fibers embedded within the layer to increase the fire and heat resistance of the substrate, as well as impact-resistance and strength. Likewise, fibers can also be added to the cementitious layer 30. In one embodiment of the present invention, fibers added to this layer consist of manufactured Zoltek ½" chopped fibers B.P. Amoco's Thermalgraph CKDX. Milled fibers, such as Panex 33 MF0200 or Thermalgraph DKDX can also be used. Poly-vinyl alcohol fibers, such as those made by Kuraray Co. can also be used, and are advantageous when used for application in concrete mixtures, and the RF350×12 mm is a preferable Kuraray fiber.

In an alternative embodiment of the present invention, the distilled water used in the cementitious veneer layer can be substituted with microclustered water produced through a process described in U.S. Pat. No. 5,711,950, or as described in U.S. Pat. No. 6,033,678. Use of such water has been found to mix more thoroughly and enhance absorption among the ingredients in the cementitious veneer layer. Empirically, use of microclustered water has been found to increase the hardness of the cured cementitious veneer layer by up to 100 percent. When used in the cementitious veneer layer, plastic or ceramic mixing blade and bowls should be used when mixing microclustered water, since metal surfaces can negatively impact the crystalline structure of the microclustered water molecules.

Figure 4:
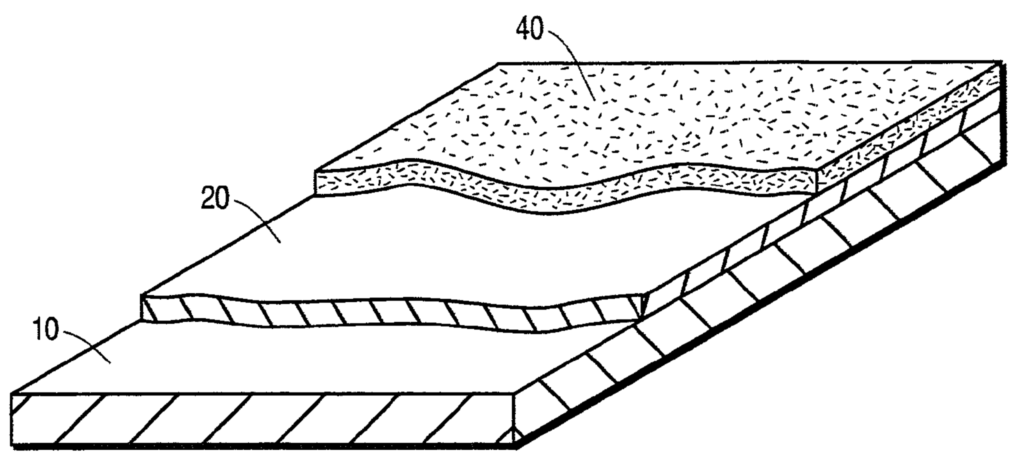
FIG. 4 is a perspective view of a decorative cementitious veneer laminate, according to a first alternative embodiment of the present invention.
Figure 5:
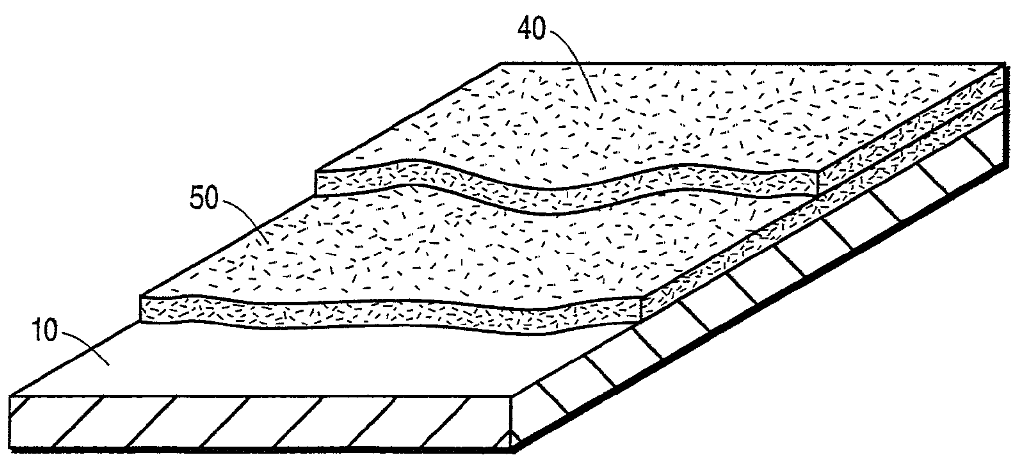
FIG. 5 is a perspective view of a decorative cementitious veneer laminate, according to a second alternative embodiment of the present invention.

FIG. 4 illustrates an embodiment of the present invention in which fibers are embedded within the cementitious veneer layer 40. The surface of this layer can be polished so that it is smooth, or it can be left unpolished to expose the granular pattern of the embedded fibers, as is illustrated in FIG. 4. Prior to curing, the surface of the veneer layer 40 can be made to mimic virtually any surface through casting, embossing, or other similar methods. FIG. 5 illustrates an embodiment in which fibers are embedded in both the adhesion layer 50 and the cementitious veneer layer 40. The fibers may be carbon fibers or kevlar fibers, glass fibers, or similar types of fibers. For the percentage amounts described above, the amount of fiber used is on the order of three to seven grams.

Instead of fibers, other strengthening materials, such as hemp may be added to either or both of the primer and cementitious veneer layers. For example, industrial hemp fibers available from Kenex Corp. are suitable types of hemp. To improve mineralization of the reinforcement materials, the hemp may be dipped in a lime solution, such as slaked lime and water or alcohol. This serves to calcify the hemp fibers and improves the texture and uniformity of the cementitious veneer.

In addition to the main formula, other fillers and/or substances can be added to or substituted in varying percentages in the cementitious veneer formula to improve hardness, and water and fire resistance. For example, aluminum hydroxide is an aggregate that increases and strengthens the cement matrix of the cementitious composition and is immune to high heated temperatures. Aggregates by nature increase porability, which is also true of aluminum hydroxide. Boric acid is a mild acid that when mixed with gypsum as well as polyvinyl alcohol creates stronger compounds. Potassium aluminum is a salt, which acts as an accelerator, hardener and fireproofing aid. When these are used together they tend to cancel each other out therefore providing the benefit of both without requiring a drying time that is either too fast or too slow. The amounts recommended for the above formula for the cementitious veneer are, 0.20 to 1.00 oz. of aluminum hydroxide, 0.5 to 0.20 oz. of boric acid, and 0.5 to 20 oz. of potassium aluminum. Certain mineral aggregates, notably quartz, exhibit advantageous water and oil resistance properties, as well as ornamental properties, that may be advantageous for use in the cementitious veneer layer.

It should be understood that the embodiments and examples provided herein are for purposes of illustration of the invention. It is envisioned that those with skill in the art can make modifications to the embodiments and examples provided herein which are within the scope and spirit of the invention.

For example, while the above embodiments and examples encompass a first (primer/adhesion) layer and a second (cementitious veneer) layer, it is contemplated that more than two layers can be applied in accordance with the present invention. Additional layers of the above described base mixture can be stacked upon each other. Likewise, additional ornamental layers can be stacked upon each other. Indeed, base layers and ornamental layers can be stacked upon each other in alternating fashion.

The composition for the cementitious laminate according to embodiments of the present invention can be provided as a kit that includes the substances required to form the primer layer and the cementitious veneer layer. Such substances can be pre-mixed, or can be supplied for mixing by the user. The kit can also include containers for mixing and storing the primer layer and cementitious veneer mixtures, as well as means for applying the layers to the substrate surface, such as a trowel.

In general, panels or tiles can be formed by coating the substrate with the adhesion layer and then applying the cementitious veneer layer within a mold. The mold can be lined with textured or shaped materials to impart an ornamental appearance or functional characteristic to the cementitious veneer panel. For example, a course textured mold can impart a rough or serrated surface that aids in grip or traction for the tile. Likewise, if a glossy finish is desired, the mold can be lined with a material such as clear vellum. Placing the cementitious veneer layer in contact with the vellum during the curing step will impart a gloss to the panel. Depending upon the type of substrate material used, the cementitious laminate can also be made into sheets similar to the production of sheet rock.

In the foregoing, a method for producing a cementitious veneer and laminate has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A cementitious veneer structure comprising:

a substrate to support a molded cementitious veneer layer, wherein the molded cementitious veneer layer is created by mixing:

a magnesium oxysulfate compound including magnesium sulfate, magnesium oxide, sodium hexametaphosphate, phosphoric acid, and water, and a cementitious composition mixed with the magnesium oxysulfate compound to form a cementitious veneer mixture, the cementitious composition including gypsum cement, filler, water, and a polyvinyl alcohol polymer mixture, and wherein the cementitious veneer layer is molded into a panel form and adhered to the substrate within a mold.

2. The cementitious veneer structure of claim 1 wherein the polyvinyl polymer mixture comprises polyvinyl alcohol fibers boiled in water with butylene carbonate.

3. The cementitious veneer structure of claim 2 wherein the cementitious veneer layer is molded into a sheet and adhered to the substrate through an adhesion layer.

4. The cementitious veneer structure of claim 2 wherein the cementitious veneer layer is molded into a tile form and adhered to the substrate through an adhesion layer.

5. The cementitious veneer structure of claim 2 wherein the magnesium oxysulfate compound comprises approximately sixty percent of the cementitious veneer mixture.

6. The cementitious veneer structure of claim 1 wherein the mold is lined with a material to impart a specific finish to the molded cementitious veneer layer.

7. The cementitious veneer structure of claim 1 wherein the mold is treated with a surface treatment to impart a specific surface characteristic to the molded cementitious veneer layer.

8. A cementitious veneer structure produced by a process comprising:

providing a substrate to support a molded cementitious veneer layer;

applying an adhesion layer to the substrate;

creating a cementitious veneer layer by mixing:

a magnesium oxysulfate compound including magnesium sulfate, magnesium oxide, sodium hexametaphosphate, phosphoric acid, and water, and a cementitious composition mixed with the magnesium oxysulfate compound to form a cementitious veneer mixture, the cementitious composition including gypsum cement, filler, water, and a polyvinyl alcohol polymer mixture, adhering the cementitious veneer layer to the substrate within a mold.

9. The cementitious veneer structure of claim 8 wherein the polyvinyl polymer mixture comprises polyvinyl alcohol fibers boiled in water with butylene carbonate.

10. The cementitious veneer structure of claim 8 wherein the cementitious veneer layer is molded into one of a tile or a sheet.

11. The cementitious veneer structure of claim 8 further comprising fibers added to the cementitious layer to enhance a functional or ornamental characteristic of the cementitious veneer layer.

* * * * *